UNITED STATES PATENT OFFICE.

JACOB SCHMITZ AND GERHARD STALMANN, OF DUSSELDORF, GERMANY, ASSIGNORS TO THE FIRM OF DR. SCHMITZ & CO., G. M. B. H.

PROCESS OF MANUFACTURING CAMPHENE.

1,030,334.   Specification of Letters Patent.   Patented June 25, 1912.

No Drawing.   Application filed November 27, 1907.   Serial No. 404,149.

*To all whom it may concern:*

Be it known that we, JACOB SCHMITZ, doctor of philosophy, chemist, and GERHARD STALMANN, doctor of philosophy, chemist, subjects of the King of Prussia, German Emperor, residing at 54 Himmelsgeisterstrasse, Dusseldorf, Kingdom of Prussia, German Empire, have invented certain new and useful Improvements in Processes of Manufacturing Camphene, of which the following is a specification.

As is known hydrochloric acid is split off with extreme difficulty from pinene hydrochlorid with the formation of camphene. While for example the isomeric camphene hydrochlorid forms camphere with alcoholic solution of potash at the boiling temperature of alcohol after some hours, pinene hydrochlorid is not attacked at all by alcoholic solution of potash at the boiling temperature of alcohol, but only such impurities as are present are transformed (German Patent 175,662). According to Riban and Berthelot (Annales de Chimie et de Physique (5) 6, 357) it is necessary to heat pinene hydrochlorid with alcoholic potash to say 200° C. for 75 hours in order to split off hydrochloric acid. The processes hitherto known for manufacturing camphene from pinene hydrochlorid, therefore employ (in so far as oxids or hydroxids are used) a medium dissolving the hydrochlorid and the base. Thus, as already stated, Riban and Berthelot use alcohol, in German Patent 153,924 soap is used as the solvent. The other processes utilize more costly means for splitting off the hydrochloric acid, such as sodium acetate, benzoate and so forth, ammonia and aliphatic bases and with few exceptions (German Patent No. 149,791) even then a solvent is employed.

We have found that pinene hydrochlorid reacts very readily with aqueous solutions of weak alkalis in forming camphene, when heated to say 160° C. in being stirred vigorously during the treatment. It has also been found that not only the alkalis hitherto employed for splitting off hydrochloric acid but also the earthy alkali hydroxids, in spite of their small solubility in water and slighter basicity, react very readily with pinene hydrochlorid in accordance with the methods referred to above. The capacity of these compounds for reacting is increased if the splitting off of the hydrochloric acid is effected in a concentrated aqueous salt solution (haloid salts for example). Alkaline earths may be replaced by other metallic oxids or hydroxids, either as such or in the form of their basic salts, such for example as aluminium, magnesium, iron, lead, copper. The large capacity for reacting possessed by these compounds was all the less to be anticipated, because in general the oxids and hydroxids utilized in accordance with the present invention present a smaller basicity than the caustic alkalis, so that it would have been expected that they would have a smaller capacity for reacting. Contrary to expectations, however, the reaction in accordance with the present invention takes place considerably more quickly than in the known processes. With the employment of alcoholic solution of potash heating for 75 hours is necessary; in the present process, on the other hand, a 4 to 5 hours heating is sufficient in order to effect the splitting off of the hydrochloric acid quantitatively.

Quite apart from the inexpensiveness of the process, the following constitutes an important technical effect: While in all the processes heretofore known, the chlorids forming in the reaction, owing to their insolubility in the solvent employed must be eliminated in time or an excess of the bases employed neutralized (German Patents 154167, 153924), the metallic chlorid formed in accordance with the present process, as described above acts favorably on the course of the reaction. It is therefore not necessary to renew the reaction liquid at each single operation but after the reaction is completed the light stratum of camphene is removed from the heavy salt solution, and according to the concentration the latter is mixed with metallic oxids or hydroxids and then used for a fresh operation. The camphene obtained in this way is very pure and free from halogen compounds and resins.

*Examples.*

1. 20 kilos of pinene hydrochlorid are heated for about 8 hours to about 200° C. with a solution of 6 kilos of hydrate of soda in 4 kilos of water and thoroughly stirred. The camphene formed is isolated in the known manner for instance by distillation or extraction by means of a suitable solvent.

2. 4 kilos of magnesium oxid are heated with 20 kilos of pinene hydrobromid in the presence of 20 liters of water as in 1.

3. 30 kilos of an aqueous chlorid of calcium solution boiling at 170° C. are boiled in the reflux apparatus with 20 kilos of pinene hydrochlorid and 5 kilos of lime for about 5 hours while being vigorously stirred, or heated for 3 hours to 200° C. in the digester. The camphene formed may be removed and rectified and the salt solution, after the addition of further lime may be employed for a fresh operation.

4. 20 kilos of pinene hydrochlorid are heated to 170° C. for 5 hours with 8 kilos of ferric oxid and 10 kilos of water and the camphene formed is isolated as described in Example 1.

We claim—

1. The process for the manufacture of camphene which comprises heating pinene hydrohaloid to temperatures above 160° centigrade with inorganic oxygen compounds of basic reaction leaving pinene haloid hydrate undissolved in the presence of water in the absence of substances dissolving pinene hydrohaloid while stirring and then separating the formed camphene from the product.

2. The process for the manufacture of camphene which comprises heating pinene hydrochlorid above 160° centigrade with lime and chlorid of calcium in the presence of water alone while stirring and then separating the formed camphene from the product.

In testimony whereof we affix our signatures in presence of two witnesses.

JACOB SCHMITZ.
GERHARD STALMANN.

Witnesses:
 WILHELM FLASCHE,
 CLEMENS HECKMANN.